United States Patent [19]

Ferris et al.

[11] 4,439,106

[45] * Mar. 27, 1984

[54] ROTOR BLADE SHAFT INTEGRITY MONITORING SYSTEM

[75] Inventors: Donald L. Ferris, Newtown; Elliot F. Olster; Michael J. Marchitto, both of Orange, all of Conn.

[73] Assignee: United Technologies Corporation, Hartford, Conn.

[*] Notice: The portion of the term of this patent subsequent to Feb. 15, 2000 has been disclaimed.

[21] Appl. No.: 388,299

[22] Filed: Jun. 14, 1982

[51] Int. Cl.³ ............................................. B64C 27/48
[52] U.S. Cl. ................................ 416/61; 416/134 A; 416/226
[58] Field of Search ................. 416/61, 134 A, 138 A, 416/141

[56] References Cited

U.S. PATENT DOCUMENTS

| | | | |
|---|---|---|---|
| 3,547,555 | 12/1970 | Jensen | 416/61 |
| 3,667,862 | 6/1972 | Parr | 416/61 |
| 3,691,820 | 9/1972 | Fiore | 416/61 X |
| 3,942,910 | 3/1976 | Snyder et al. | 416/141 |
| 4,203,708 | 5/1980 | Rybicki | 416/134 A |
| 4,264,277 | 4/1981 | McCafferty | 416/134 A |
| 4,373,862 | 2/1983 | Ferris et al. | 416/61 |

FOREIGN PATENT DOCUMENTS

| | | | |
|---|---|---|---|
| 2709199 | 9/1977 | Fed. Rep. of Germany | 416/134 A |
| 1568455 | 5/1980 | United Kingdom | 416/61 |
| 382548 | 10/1974 | U.S.S.R. | 416/61 |

*Primary Examiner*—Everette A. Powell, Jr.
*Attorney, Agent, or Firm*—Vernon F. Hauschild

[57] ABSTRACT

A helicopter rotor blade to hub arm attachment configured to react centrifugal loads from the blade through a blade cuff, spindle, and elastomeric bearings utilizes a bolt in the bore of the spindle for secondary load path operation and a spindle integrity monitoring indicator to provide a visual showing of a deviation from the normal load path.

5 Claims, 5 Drawing Figures

ROTOR BLADE SHAFT INTEGRITY MONITORING SYSTEM

DESCRIPTION

1. Technical Field

This invention relates to helicopter rotors and more particularly to a redundant tension member for a rotor blade retention spindle in combination with an indicator system to reveal the load carrying status of the tension member.

2. Background Art

Current production helicopters use elastomeric bearings to support rotor blades from rotor hubs for full articulated motion. Such elastomeric bearings comprise stacks of thin alternating rubber and metal laminates in various geometric shapes. Blade motions in lead-lag, flapping, and pitch change are accommodated by incremental shear of the rubber laminates, and devices are incorporated to prevent tension loads from being introduced into these bearings. The need for lubrication of bearings is pre-empted. One configuration for a helicopter rotor using elastomeric bearings is shown in U.S. Pat. No. 4,203,708 to Rybicki. Each rotor blade is attached to its associated rotor hub arm by a root end blade shank or shaft portion called a spindle. The spindle extends from the blade attachment joint through the center of the elastomeric support bearing and is attached to the inner race of that bearing by a large nut on the innermost end of the spindle. The outer race of the bearing is in turn attached to the hub arm, and the spindle is thus in position to react in tension th=full centrifugal blade load. In addition to its threaded inner end portion, the spindle also includes an external spline to engage the bearing race to preclude relative motion therebetween, and at an intermediate station includes a journal type shear bearing to react bearing side loads. Toward the outboard end of the spindle, bifurcated flanges provide connecting means for the pitch control horn, and a second flange member provides attachment means for an inplane blade damper. To this extent the blade spindle is similar to that illustrated in U.S. Pat. No. 4,203,708 to Rybicki, which is used on the Sikorsky S-76 helicopter.

Recent development efforts have addressed the desirability of redundancy in components to provide alternate or backup load paths in the event of concern for the structural integrity of the primary member. A challenge to the designer is to integrate a redundancy feature with an indicator system to alert pilots or maintenance personnel to the occurrence of an incident wherein the secondary system has assumed the role of primary load carrier. This integration must be performed with a minimum of negative impact on weight, cost, drag, and maintenance requirements. A very recent embodiment providing redundancy and inspection to the spindle illustrated in the aforementioned U.S. Pat. No. 4,203,708 is shown and claimed in U.S. Patent Application Ser. No. 315,125 filed on Oct. 26, 1981 in the name of Donald L. Ferris et al and entitled Rotor Blade Shaft Integrity Monitoring System, now U.S. Pat. No. 4,373,862.

DISCLOSURE OF INVENTION

The aforementioned patent application presents combination of a redundancy feature and an inspection system in a specific embodiment using a pre-loaded bolt as a redundant member and a pressurized reservoir containing red dye adapted to drive the tell-tale free flowing dye through any crack or opening in the primary spindle member. The displacement of the bellows type reservoir as its pressure is reduced, together with the brilliant color of the dye on external surfaces of the spindle, provides a dual indication of the diversion of the primary load path to its secondary path.

A second embodiment of the combination of a redundant number and an inspection or integrity monitoring system is presented herein as an alternate to that presented in the aforementioned patent application. While this alternate embodiment also uses a redundant bolt in the hollow interior of the spindle, the bolt is not pre-loaded to share the primary load but is purposely held in reserve. Similarly, the reservoir containing red dye is not pressurized under primary load path operating conditions but becomes pressurized upon loading of the redundant bolt. This embodiment eliminates the need for seals to form a pressurized chamber encapsulating the bolt and internal spindle cavity, thus eliminating any environmental adverse effects inherent in the use of seals. Further, the requirement in the initial embodiment for the dye to escape through a crack or fracture in the spindle is eliminated, thus avoiding the possibility of dye flow failure due to crack closure upon load decrease as due to a landing. Still further, while the dual indication system depends on the visible appearance of the red dye staining the exterior surfaces of components, the second indication comprising displacement of the bellows as it collapses upon pressure loss is eliminated in this second embodiment in favor of a pressure relief cap associated with the dye reservoir. Since there is no need for visibly measured axial motion of the reservoir, its deflection prior to its pressure relief can be minimal, and the reservoir may be quite small. This size advantage is one of the attractive features of this alternate embodiment over that presented in the earlier patent application. In the case of selection of a system for the SH-60B "Seahawk" helicopter, this packaging advantage was appreciated, since internal spindle space was limited due to the feature of automatic rotor blade folding and the need for attendant components. The interior of the spindle, especially the enlarged outer end where the blade is attached, is a convenient and close location in which to locate the blade fold actuator. Because of this space limitation and the attractiveness of the features enumerated above, this alternate embodiment was chosen.

BEST MODE FOR CARRYING OUT THE INVENTION

Figure 1:
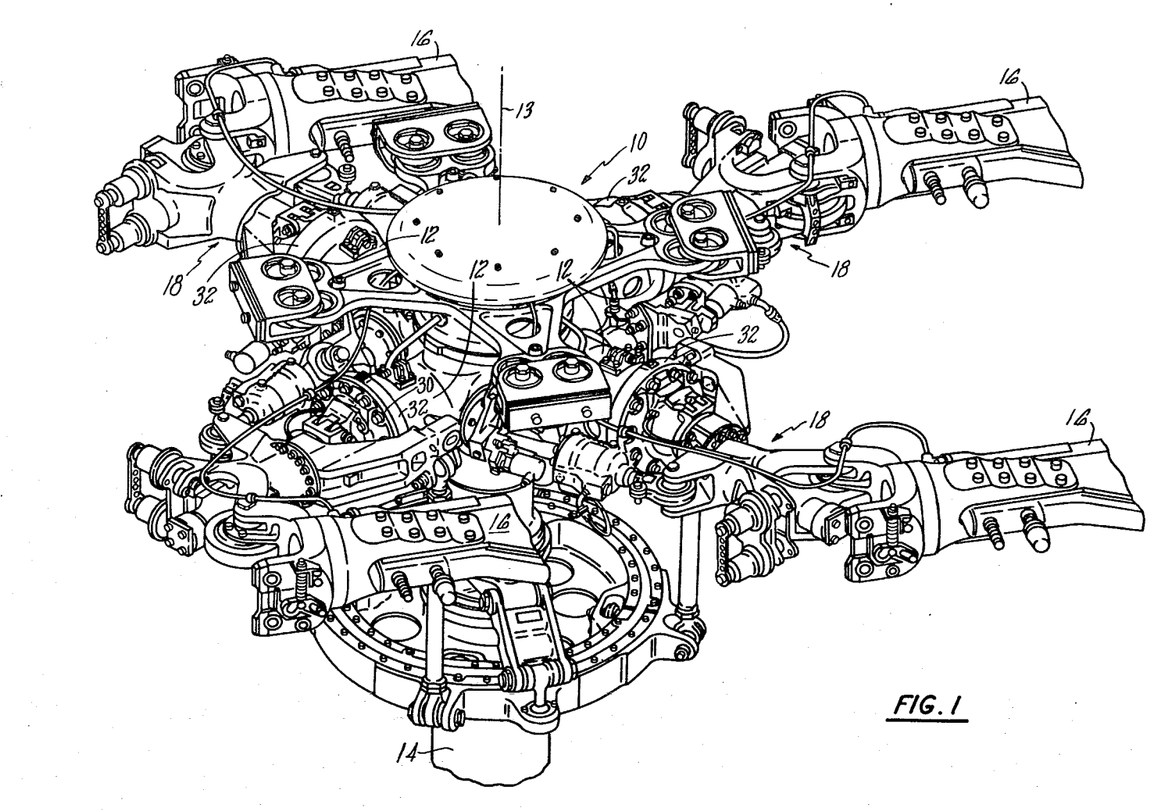
FIG. 1, is an isometric view of the SH-60B "Seahawk" helicopter rotor head.
Figure 1A:
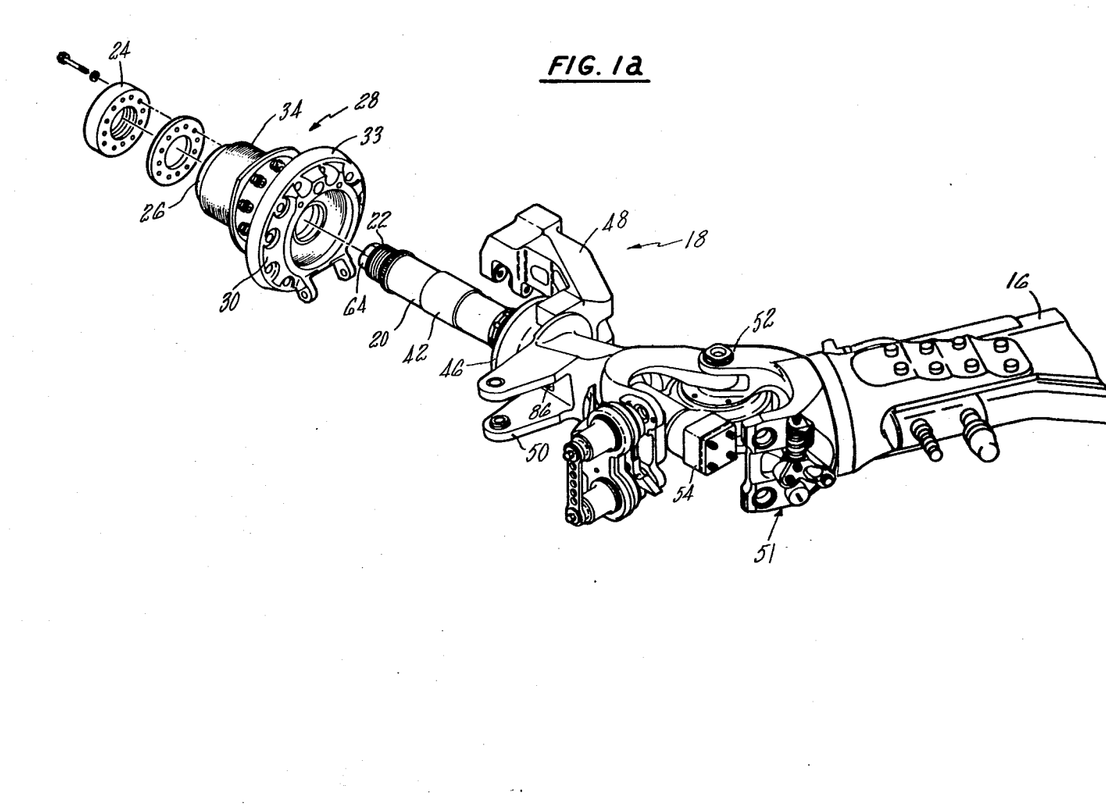
FIG. 1a is an exploded isometric view of one of the spindle assemblies shown in the rotor hub of FIG. 1.

A typical Sikorsky type elastomeric bearing rotor head is depicted in FIG. 1 wherein hub 10 includes four hub arms 12 and which hub 10 is mounted for rotation about axis 13 of drive shaft 14. A rotor blade 16 is mounted to each hub arm 12 by a spindle assembly 18 to provide full articulated rotor blade motion in pitch, droop, flap, lead, and lag. The main component of the spindle assembly 18 is the spindle shaft 20, as best shown in FIG. 1a, a generally cylindrical member extending generally radially from the rotor axis 13. The inner end 22 of the spindle 20 is threaded and engages retention nut 24 (see FIG. 2). The nut 24 bears against the inner race 26 of a bearing array 28 having an outer race 30 or flange that bolts to the outer flange 32 (see FIG. 1) of the hub arm 12. The bearing array 28 comprises spherical and thrust bearings 33 and 34, respectively, more specifically described with reference to U.S. Pat. No. 3,782,584. Spline 36 of spindle 20 engages an internal spline (not shown) of inner race 26 of bearing 34 to prevent relative rotation of the bearing array 28 and spindle 20. The further complexity and importance of the spindle assembly 18 is realized by noting that its components also include shear bearing 42, droop stop ring 46, pitch control horn 48, and damper mounting lugs 50.

The spindle assembly 18 depicted in this application differs from that of the aforementioned application on similar subject matter because the SH-60B helicopter is equipped for automatic blade folding for storage purposes. The mechanism to perform this folding function consists of a hinged joint 52, including lock assembly 51, at the point of connection between the rotor blade 16 and spindle assembly 18. Although this joint 52 is not a part of this invention, it does produce an effect, inasmuch as the internal space available for locating spindle integrity monitoring items is limited due to the need to locate blade fold items in the same area. More specifically, FIG. 2 depicts the electrical blade fold actuator 54 located in the internal chamber 56 of the outer cone shaped end of the spindle 20.

Figure 2:
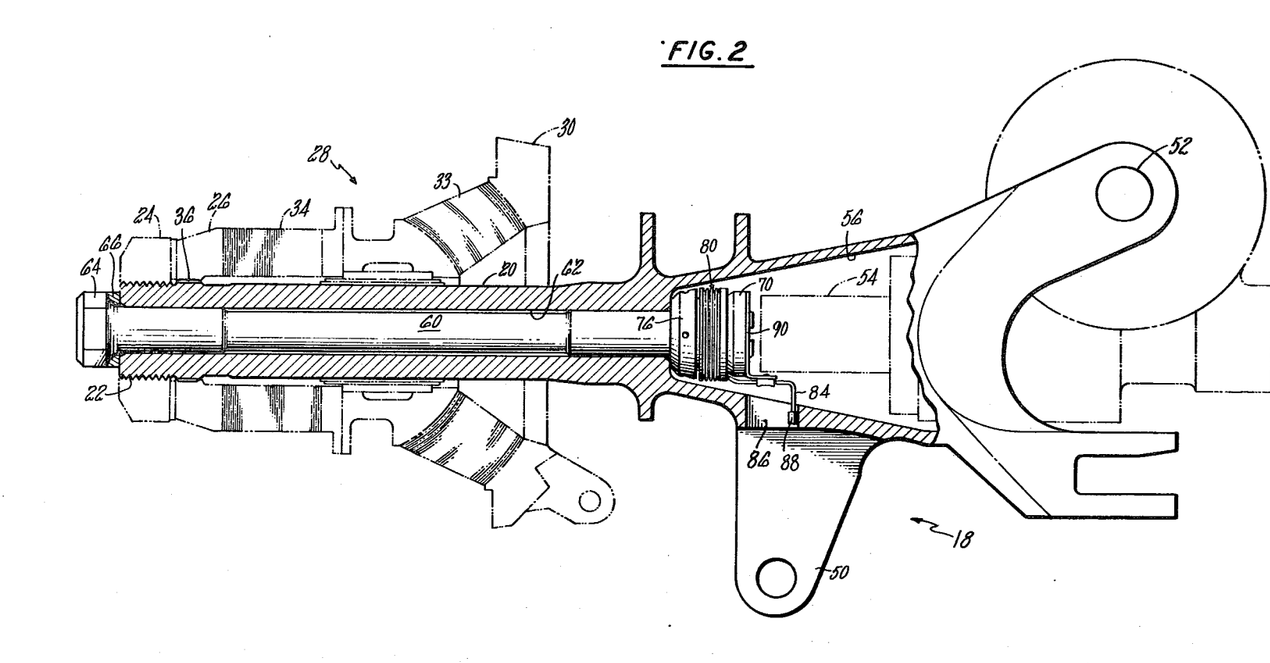
FIG. 2 is a larger scale cross-sectional showing of a typical spindle assembly installed in a hub arm and depicting the embodiment of this invention.

FIG. 2 illustrates the redundant means used with the spindle assembly to provide a secondary load path for the centrifugal load imposed in flight by the extending rotor blade in the event of damage to the spindle per se. Also shown is the specific embodiment conceived for this application of a spindle integrity monitoring means to indicate to the operator or service personnel that the redundant member has taken over full load carrying function and that spindle replacement should be scheduled. Still with reference to FIG. 2, we observe that the primary load path for the reaction to blade generated centrifugal force travels as a tension load the length of spindle 20 from the load connection at joint 52 to the threaded connection 22 at nut 24. The load then becomes a compressive load from nut 24 into the bearing array 28 and outer bearing race 30. The bolted connection between race 30 and hub flange 32 transfers the load to hub arm 12.

A secondary or backup load path is established for the tension load referred to above by the use of a long bolt 60 through the internal bore 62 of spindle 20. The bolt head 64 and a spherical washer 66 are located at the radial inner end of spindle 20, and the spherical washer 66 functions due to its shape to center the bolt 60 and render essentially constant tensile loading across its diameter. The threaded end 68 of bolt 60 receives nut 70, and both are located in internal chamber 56 of the outer end of spindle 20. A stackup of first and second washers 72, 74 and spacer 76 allows the nut 70 to indirectly bear against shoulder 78 of spindle 20 where cavity 56 transitions to bore 62. Thus located, the bolt 60 stands ready to receive the tension loading of spindle 20 inboard of spindle shoulder 78, should damage occur to that spindle 20, rendering it unable to sustain the blade load. In any instance wherein a redundant member assumes loading due to failure of the primary member, it is mandatory that the takeover be known to the operator or maintenance personnel so that replacement of the primary member can be scheduled. It is tedious and difficult to inspect the entire length of the spindle to learn of a possible damaged condition because a large portion of the spindle 20 is hidden from external view by the bearing array 28 and hub arm 12. Thus, a dual spindle inspection system has been incorporated to monitor the integrity of the spindle 20 to provide a readily detectable and visual indication of the spindle load carrying function. The embodiment of the system presented herein comprises a reservoir assembly 80 in the form of a metal bellows 81 containing red dye in a non-pressurized condition. As shown in detail in FIG. 3, the reservoir 80 is ring shaped and is sealed at opposite axial ends by end plates 82, 83. Extending through the outer end plate 82 of reservoir assembly 80 is a single transfer tube 84 leading from the spindle cavity 56 externally through an observation port 86 in spindle 20. Cap 88 is attached to the outer end of the tube 84 and serves as a relief valve. It is the function of the system to pressurize the reservoir 80 as the bolt 60 is loaded, with the resultant pressure buildup sufficient to drive the cap 88 from the end of the tube 84 and spray the dye contained therein onto adjacent and external parts and surfaces. The absence of the indicator cap 88 and the stain left from the red dye on rotor components external of the observation port 86 thus provides two signals to maintenance personnel of load path transfer from the primary to a secondary system.

The providing of pressurization to the reservoir 80 as a function of bolt loading is accomplished as follows with reference to FIG. 3. The tang washer 90 that is used to lock spindle 20 to nut 70 includes an ear 91 that extends outwardly into cavity 56 and secures transfer tube 84 in place. The reservoir assembly 80, consisting of bellows 81, end plates 82, 83, transfer tube 84 and relief cap 88 are thus securely retained against an outer shoulder 92 of nut 70. From FIG. 3 it may be noted that the inner end plate 83 of the reservoir assembly 80 is set back slightly outboard of the inner face 94 of the nut 70 and outer face 95 of spacer 76. Gap "a" is established between spacer 76 and reservoir assembly 80 and must exist during primary load path operation. Spacer 76, which directly abuts shoulder 78 of spindle 20, is cup shaped, and its outer wall 96 overlaps the outer diameters of washers 72 and 74 and nut 70. Washer 74 is fabricated of a soft, extrudable, or frangible material such as lead or a suitable non-metallic, and its width exceeds the dimension of gap "a". The gap "a" is predetermined with regard to the thermal characteristics of the spindle 20 and bolt 60 as well as load stretch of spindle 20. An annulus 97 and several radial holes 98 are formed in spacer 76 at locations adjacent washer 74. In the event that the spindle inboard portion becomes damaged and unable to react tension loading, the bolt 60 will become loaded in tension as the load path is transferred to the bolt through spacer 76, washers 72 and 74, and nut 70. Under loading and due to its soft material, washer 74 will decrease in thickness by extruding into annulus 97 and holes 98 of spacer 76. The outboard portion of damaged spindle 20 will have outward with spacer 76 and washer 72 along bolt 60 towards nut 70, thus closing the gap "a" and causing face 95 of spacer 76 to press against reservoir assembly 80. Sufficient travel of the spacer 76 along the bolt 60, based on the extrusion of washer 74, is required to squeeze the reservoir assembly 80 against nut shoulder 92 to provide the pressure buildup necessary to blow off cap 88 and spray the red dye onto external surfaces. With the cap 88 blown from the end of the transfer tube 84, centrifugal blade force will assist the pressure in reservoir 80 in forcing the dye out of the tube 84.

There are a number of variants that may be desirable to the particular embodiments illustrated and described heretofore. One of these is the use or non-use of the extrudable/crushable washer 74. Some designers may prefer to omit the washer completely in favor of precisely positioning the nut 70 axially along the bolt 60 so as to create a predetermined looseness for spacer 76 between the nut 70 and the shoulder 78. This may have the advantage of weight saving in omitting washer 74, but it introduces the possibility of occasional contact between the spacer 76 and the reservoir assembly 80 due to aircraft maneuvers or altitude changes. It also introduces the possible error in gap measurement. The advantage of use of the extrudable washer 74 is that there can be a positive torque exerted on nut 70 that will provide assurance of a firm stack up of parts and a reliable expectation that bolt loading will trigger pressurization of the reservoir 80. A conical spring or Belleville type washer is an alternate to the extrudable washer 74. It is very important that the selected member provide repeatability at similar levels. Another of the advantages of the extruded type member 74 is that the controlled rate of extrusion prevents high impact loading of the bolt 60. The extrusion action serves as a damper in the gradual buildup of the full tension loading. Another variant is the use of dye and the blow-off cap 88. While the spread of the dye, especially as assisted by centrifugal force, is used as the preferred medium, a designer's choice may be to keep the pressurized fluid captivated and merely provide a movable indicator at the exterior end of the transfer tube 84. While one transfer tube is depicted, several may be utilized, or other means of conducting the dye to the exterior of the spindle may be used while accomplishing the objects of this invention. Likewise, another form of collapsible container could be used to perform the same function as the metal bellows 81 depicted herein.

Another possibly desired variation in the configuration of our shaft monitoring system relates to the length of the redundant bolt and location of the reservoir. This variant can also be implemented without departure from the scope of the invention and is shown as FIG. 4. The radial inner end of the spindle 20, where the thread 22 and spline 36 are located, is considered to be the most critical portion of the spindle and the focal point of our inspection system. Thus, in order to save weight and yet monitor the spindle inner end, it may be desirable to use a shorter bolt that does not extend through the full bore of the spindle. A short bolt 61 is depicted in the bore 62 of spindle 20, with its head 64 and spherical washer 66 abutting the spindle inner end.

Figure 3:
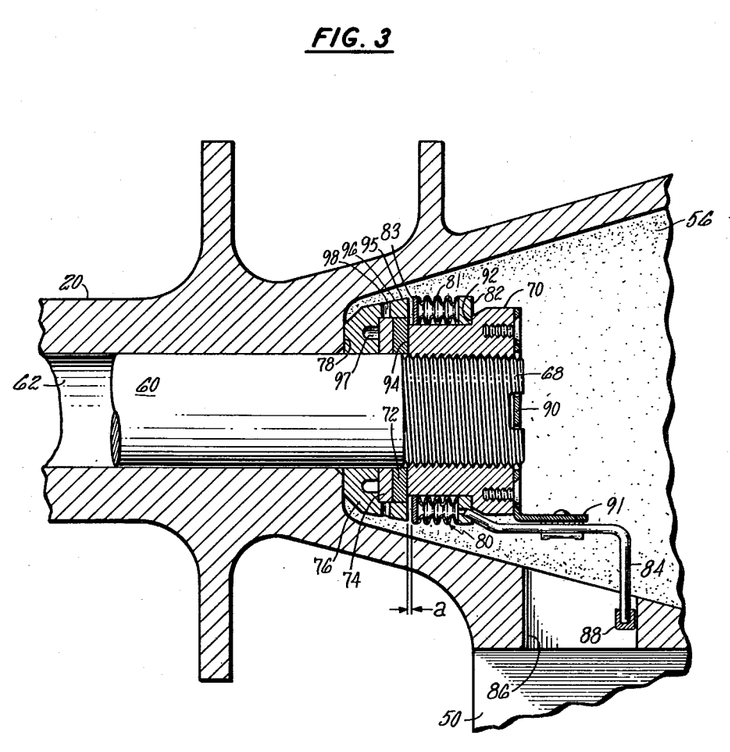
FIG. 3 is a still larger scale showing of the outboard end of the spindle to more clearly illustrate the reservoir and pressure producing members.

The apparatus for securing the bolt to the spindle, and the reservoir containing the dye are both located in this alternate embodiment in a counterbore 63 of the spindle 20 at a radial station closer to the bolt head, where they perform functions similar to the apparatus of FIG. 3.

Figure 4:
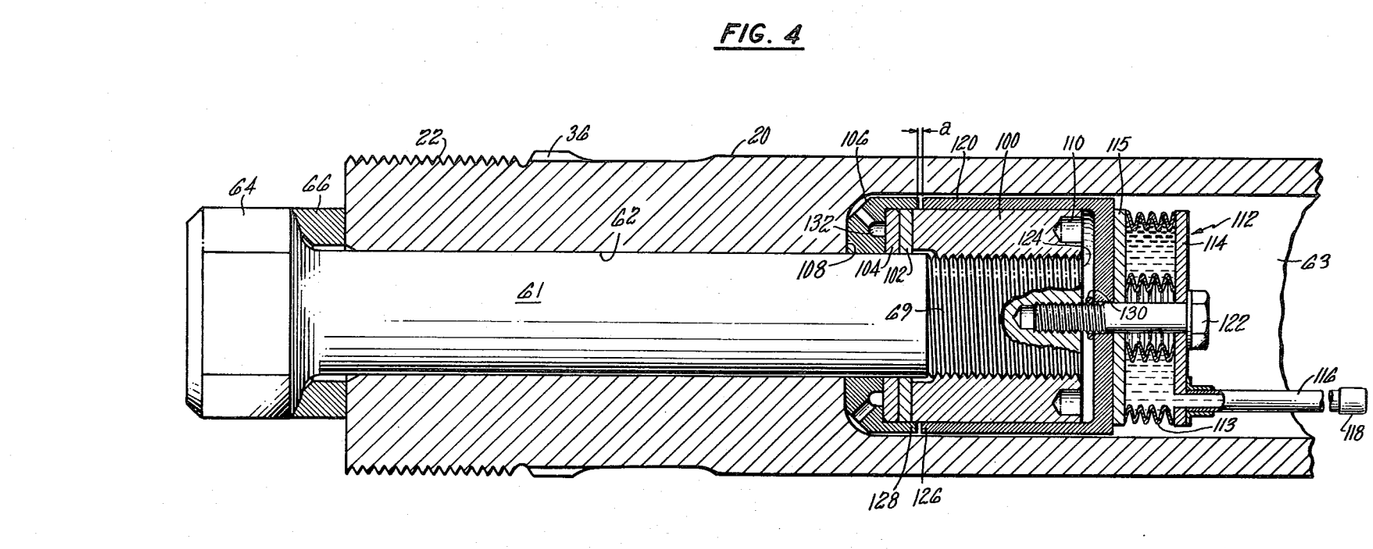
FIG. 4 is a cross-sectional showing similar to that of FIG. 2, but illustrating an alternative embodiment of this invention.

Cylindrical nut 100 engages threads 69 of bolt 61, and the stack up of first and second washers 102, 104, and spacer 106 allows the nut 100 to indirectly bear against shoulder 108 of spindle 20 where the counterbore 63 transitions to bore 62. Nut 100 is designed to be torqued onto the spindle from one end, due to its internal location, and multiple wrench holes 110 are available for such torquing. Reservoir assembly 112 (similar to reservoir assembly 80 of FIG. 3) consists of bellows 113, end plates 114 and 115, transfer tube 116 and relief cap 118, as well as cup-member 120 and screw 122. Bellows 113 is ring shaped and brazed to end plates 114 and 115, and together with long tube 116 forms a pressure vessel to hold the dye. The reservoir assembly 112 is rigidly attached to the end 124 of bolt 61 by screw 122 in a manner to leave gap "a" between the inner axial end 126 of cup 120 and the outer end 128 of spacer 106, and also to leave the bellows unpressurized. The cup member 120 may be restrained from dropping away from screw 122 on assembly by a rubber band 130 or other temporary retention means necessary until the screw 122 is engaged.

The providing of pressurization of the reservoir 112 as a function of bolt loading is accomplished as follows with reference to FIG. 4, and generally following the manner of the configuration of FIG. 3. In the event that the spindle inboard portion, as in the area of the spline 36, becomes damaged and unable to react tension loading, the bolt 61 will become loaded in tension as the load path is transferred to the bolt through spacer 106, washers 102 and 104 and nut 100. Washer 104 is soft, and will extrude into holes 132 in spacer 106 as the spacer moves toward the nut 100 and closes gap "a". Once the gap "a" is closed, spacer 106 will contact cup-member 120, and continued axial motion outward (to the right in FIG. 4) will drive end plate 115 outward toward end plate 114, this pressurizing the bellows 113. As described heretofore for FIG. 3, the cap 118 will be blown off the end of tube 116 and the red dye will be sprayed onto external surfaces. The difference between the two configurations is the longer tube and cylindrical nut of FIG. 4, which accomplishes a weight savings.

We wish it to be understood that we do not desire to be limited to the exact details of construction shown and described, for obvious modifications will occur to a person skilled in the art.

We claim:

1. A helicopter rotor including a hub member mounted for rotation about an axis of rotation and having at least one hub arm and related helicopter blade projecting substantially radially therefrom for rotation therewith, and an improved spindle assembly comprising:
 a hollow spindle shaft extending radially from within the hub arm and outwardly therebeyond and having a radial inner end, a radial outer end, and a central bore extending the full length of said shaft, said radial outer end shaped to define an enlarged chamber contiguous with the spindle bore and being adapted to be operatively connected to a helicopter blade, bearing means operatively connecting the spindle shaft inner end to the hub arm and operative so as to support said spindle shaft and hence the blade from the hub so that blade centrifugal loading during rotor operation will be passed through said spindle shaft and said bearing means to said hub, a bolt extending through the spindle shaft bore for the full length and having an inner end comprising a bolt head abutting said spindle inner end and having an outer end extending beyond the radially outer end of the shaft bore and into said spindle outer end enlarged chamber, means to operatively connect the bolt outer end to the spindle shaft outer end to serve as a redundant centrifugal load path in the event of spindle shaft failure, a closed reservoir located in said spindle enlarged chamber containing a fluid dye in a normally unpressurized condition, wherein the reservoir includes a conduit for dye passage to a location externally of the spindle, and a pressure relief member at the end of the conduit, and means to cause pressurization of said reservoir upon loading of the bolt beyond the pressure level required to actuate said relief member.

2. A helicopter rotor including a hub member mounted for rotation about an axis of rotation and having at least one hub arm and related helicopter blade projecting substantially radially therefrom for rotation therewith, and an improved spindle assembly comprising:

a hollow spindle shaft extending radially from within the hub arm and outwardly therebeyond and having a radial inner end, a radial outer end, a central bore extending the full length of said shaft, and a counter bore extending from said radial outer end to define an enlarged chamber within the spindle, and being adapted to be operatively connected to a helicopter blade, bearing means operatively connecting the spindle shaft inner end to the hub arm and operative so as to support said spindle shaft and hence the blade from the hub so that blade centrifugal loading during rotor operation will be passed through said spindle shaft and said bearing means to said hub, a bolt extending through the spindle shaft central bore and having an inner end comprising a bolt head abutting said spindle inner end and having an outer end extending into said spindle enlarged chamber, means to operatively connect the bolt outer end to the spindle shaft outer end to serve as a redundant centrifugal load path in the event of spindle shaft failure, a closed reservoir located in said spindle enlarged chamber containing a fluid dye in a normally unpressurized condition, wherein the reservoir includes a conduit for dye passage to a location externally of the spindle, and a pressure relief number at the end of the conduit, and means to cause pressurization of said reservoir upon loading of the thrubolt beyond the pressure level required to actuate said relief member.

3. A helicopter rotor according to claim 1 or 2 wherein the reservoir comprises a metal bellows assembly, and the means to cause reservoir pressurization includes a spacer member located coaxially along the bolt with a surface aligned to contact and compress the reservoir upon bolt loading.

4. A helicopter rotor according to claim 3 wherein an extrudable washer is located in contact with the spacer member and adapted to be decreased in thickness upon bolt loading.

5. A helicopter rotor according to claim 4 wherein voids are provided in the spacer member to receive the extruded washer material.

* * * * *

UNITED STATES PATENT AND TRADEMARK OFFICE
CERTIFICATE OF CORRECTION

PATENT NO. : 4,439,106

DATED : March 27, 1984

INVENTOR(S) : DONALD L. FERRIS ET AL

It is certified that error appears in the above-identified patent and that said Letters Patent is hereby corrected as shown below:

Col. 1, Line 32   "the=" should read --the--

Line 65   After "presents", insert --the--

Col. 2, Line 10   "number" should read --member--

Col. 5, Line 5    "have" should read --move--

Line 28   "altitude" should read --attitude--

Col. 8, Line 21   "number" should read --member--

Signed and Sealed this

Fifteenth Day of October 1985

[SEAL]

Attest:

DONALD J. QUIGG

Attesting Officer

Commissioner of Patents and Trademarks—Designate